United States Patent
Akerberg et al.

(10) Patent No.: US 8,885,593 B2
(45) Date of Patent: Nov. 11, 2014

(54) DYNAMIC ASSIGNING OF BANDWIDTH TO FIELD DEVICES IN A PROCESS CONTROL SYSTEM

(71) Applicants: Johan Akerberg, Vasteras (SE); Krister Landernas, Hallstahammar (SE); Mikael Gidlund, Sundsvall (SE)

(72) Inventors: Johan Akerberg, Vasteras (SE); Krister Landernas, Hallstahammar (SE); Mikael Gidlund, Sundsvall (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 14/098,233

(22) Filed: Dec. 5, 2013

(65) Prior Publication Data
US 2014/0092847 A1 Apr. 3, 2014

Related U.S. Application Data

(63) Continuation of application No. PCT/EP2011/059729, filed on Jun. 14, 2011.

(51) Int. Cl.
H04W 4/00 (2009.01)
H04J 3/00 (2006.01)
H04W 28/20 (2009.01)
H04W 72/04 (2009.01)

(52) U.S. Cl.
CPC ........ H04W 72/044 (2013.01); H04W 72/0446 (2013.01); H04W 28/20 (2013.01)
USPC ............................. 370/329; 370/280; 370/336

(58) Field of Classification Search
USPC .......................................... 370/329, 336, 280
See application file for complete search history.

(56) References Cited

U.S. PATENT DOCUMENTS

| | | | |
|---|---|---|---|
| 7,769,389 B1 | 8/2010 | Mangal et al. | |
| 7,925,249 B2 | 4/2011 | Funk et al. | |
| 8,315,263 B2 * | 11/2012 | Enns et al. | 370/400 |
| 2005/0036475 A1 * | 2/2005 | Nishiyama et al. | 370/347 |
| 2006/0031426 A1 | 2/2006 | Mesarina et al. | |
| 2007/0168060 A1 * | 7/2007 | Nixon et al. | 700/83 |
| 2009/0010204 A1 * | 1/2009 | Pratt et al. | 370/328 |
| 2009/0010233 A1 * | 1/2009 | Pratt et al. | 370/338 |
| 2009/0046675 A1 * | 2/2009 | Pratt et al. | 370/337 |

(Continued)

FOREIGN PATENT DOCUMENTS

| | | |
|---|---|---|
| EP | 2019534 A1 | 1/2009 |
| WO | 2005125155 A1 | 12/2005 |
| WO | 2010133250 A1 | 11/2010 |

OTHER PUBLICATIONS

International Preliminary Report on Patentability Application No. PCT/EP2011/059729 Completed: Jul. 4, 2013 4 pages.

(Continued)

Primary Examiner — Nicholas Jensen
(74) Attorney, Agent, or Firm — St. Onge Steward Johnston & Reens LLC

(57) ABSTRACT

A wireless network managing device for a wireless network that is part of a process control system. The wireless network managing device includes a node determination element configured to receive an operator selection of at least one node in the process control system via an operator terminal and determine a field device implementing the functionality of the node, and a bandwidth control element configured to adjust a bandwidth assigned to the at least one field device in an auxiliary data section of a communication structure used by the wireless network based on the received operator selection in order to increase system responsiveness.

16 Claims, 3 Drawing Sheets

(56) References Cited

U.S. PATENT DOCUMENTS

| | | | |
|---|---|---|---|
| 2009/0046732 A1* | 2/2009 | Pratt et al. | 370/406 |
| 2009/0059814 A1* | 3/2009 | Nixon et al. | 370/254 |
| 2010/0188410 A1* | 7/2010 | Gilbert et al. | 345/473 |
| 2011/0072382 A1* | 3/2011 | Caldwell et al. | 715/772 |
| 2011/0216656 A1* | 9/2011 | Pratt et al. | 370/241 |
| 2012/0035749 A1* | 2/2012 | Schleiss et al. | 700/79 |

OTHER PUBLICATIONS

International Search Report & Written Opinion of the International Searching Authority Application No. PCT/EP2011/059729 Completed: Mar. 19, 2012; Mailing Date: Mar. 26, 2013 10 pages.

* cited by examiner

DYNAMIC ASSIGNING OF BANDWIDTH TO FIELD DEVICES IN A PROCESS CONTROL SYSTEM

FIELD OF THE INVENTION

The present invention generally relates to the assigning of bandwidth to field devices in wireless networks. More particularly the present invention relates to a method for assigning bandwidth to wireless field devices as well as to a wireless network managing device and computer program product implementing a wireless network managing device.

BACKGROUND OF THE INVENTION

Wireless sensor networks are known to be used in process control systems. Examples on such networks are ZigBee and WirelessHart.

These networks typically employ a time division communication scheme where a field device may use a fixed allocated bandwidth in a reporting data section of the scheme for reporting data and another possibly allocated bandwidth in a status section of the scheme for reporting status on the functioning or health of the field device.

It is at times of interest to change the status reporting structure of the field devices and some documents are concerned with this.

U.S. Pat. No. 7,925,249 does for instance describe a wireless sensor network, where a user can make a number of reconfigurations, including the interval for automatic periodic connection and status notifications, which reconfigurations are performed via a web portal.

EP 2019534 describes a wireless sensor network, which can be reconfigured to different needs of a mission. Examples on needs that are given are putting sensors into sleep state when not needed.

US 2006/0031426 describes programming of nodes in a sensor network.

However, it would be interesting to allow such change to be more easily made on behalf of an operator in order to improve the responsiveness of the system. The present invention is therefore directed towards simplifying for an operator to adjust the bandwidth assignments made in the communication structure.

SUMMARY OF THE INVENTION

The present invention is directed towards improving user-friendliness in the assigning of bandwidth to field devices in a wireless network as well as the overall system responsiveness.

One object of the present invention is to provide a user-friendly method for assigning bandwidth to wireless field devices in an auxiliary data section of a communication structure used by a wireless network.

This object is according to a first aspect of the present invention achieved through a method for assigning bandwidth to wireless field devices in an auxiliary data section of a communication structure used by a wireless network, said wireless network being provided in a process control system, the method comprising the steps of:
receiving an operator selection of at least one node in the process control system via an operator terminal,
determining a field device implementing the functionality of the node, and
adjusting the bandwidth assigned to said at least one field device in the auxiliary data section based on the received operator selection.

Another object of the present invention is to provide a wireless network managing device for a wireless network part of a process control system, which device provides a user-friendly change of bandwidth.

This object is according to a second aspect of the present invention achieved through a wireless network managing device for a wireless network that is part of a process control system, the wireless network managing device comprising:
a node determination element configured to receive an operator selection of at least one node in the process control system via an operator terminal and determine a field device implementing the functionality of the node, and
a bandwidth control element configured to adjust a bandwidth assigned to said at least one field device in an auxiliary data section of a communication structure used by the wireless network based on the received operator selection.

Another object of the present invention is to provide a computer program product for a wireless network managing device for a wireless network, which computer program product provides a user-friendly change of bandwidth.

This object is achieved by a computer program product for a wireless network managing device for an industrial wireless communication network that is part of a process control system, the computer program product comprising a data carrier with computer program code which when run on a processor forming the wireless network managing device, causes the wireless network managing device to:
receive an operator selection of at least one node in the process control system via an operator terminal,
determine a field device implementing the functionality of the node, and
adjust a bandwidth assigned to said at least one field device in an auxiliary data section of a communication structure used by the wireless network based on the received operator selection.

The present invention has a number of advantages. Because the bandwidth assigned to field devices in the auxiliary data section is adjusted based on operator selections at the operator terminal, a more user-friendly change is obtained. In this way the operator may obtain a change in bandwidth for a field device that is of interest to him or her without personally having to make the bandwidth change. It can also be seen that the change in bandwidth is made automatically in order to improve the system responsiveness for the operator. The wireless network thus dynamically reacts to the activities of the operator at the operator terminal. The invention can also be used with existing field devices and gateways and does not require any additional hardware. It also gives the operator an improved operation without requiring special devices. The invention also works on equipment from many different suppliers.

BRIEF DESCRIPTION OF THE DRAWINGS

The present invention will in the following be described with reference being made to the accompanying drawings, where
FIG. 1 schematically shows a process control system for controlling a process using a wireless network.

DETAILED DESCRIPTION OF THE INVENTION

In the following, a detailed description of preferred embodiments of the invention will be given.

Figure 1:
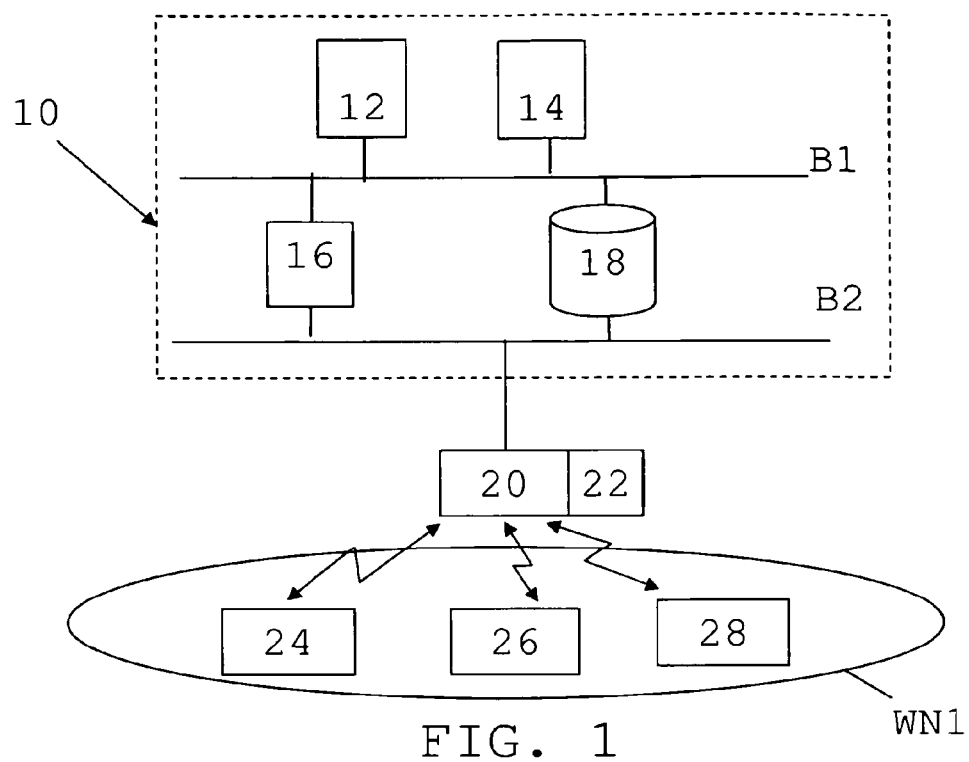

FIG. 1 schematically shows a control system 10 for a process, i.e. a process control system. The process may be an industrial process and may furthermore be any of a number of different types of processes such as a pulp and paper production process, an oil refining process, an electric power transmission process or an electric power distribution process. The control system 10 may for instance be an object based computerised system for controlling the process.

In FIG. 1 the process control system 10 includes a number of operator terminals 12 and 14 connected to a first bus B1. There is furthermore a second bus B2 and between the first and second busses there are connected a server 16 providing control and monitoring of the process and a database 18 where data, like historical data relating to control and monitoring of the process is stored. To the second bus B2 there is furthermore connected a gateway 20, which gateway is in turn connected to a first wireless network WN1. The wireless network may be an industrial network and may also be a wireless communication network. It may more particularly be a wireless sensor network and may thus be an industrial wireless sensor network. The wireless network may also be a time division multiple access (TDMA) wireless network. In this first wireless network WN1 there are shown three exemplifying wireless field devices, a first field device 24, a second field device 26 and a third field device 28. The field devices are devices that are interfaces to the process and they communicate wirelessly with the gateway 20. The field devices 24, 26, 28 may typically be responsible for performing some type of control activity of the process, such as measuring a process parameter like a physical property of the process or providing a control activity in the process, such as actuating a valve, operating a pump, a switch etc. The actual control of the field devices is performed by the server 16. To the gateway 20 there is furthermore connected a wireless network managing device 22, which manages the wireless field devices. This managing may comprise assigning bandwidth to the field devices.

Figure 2:
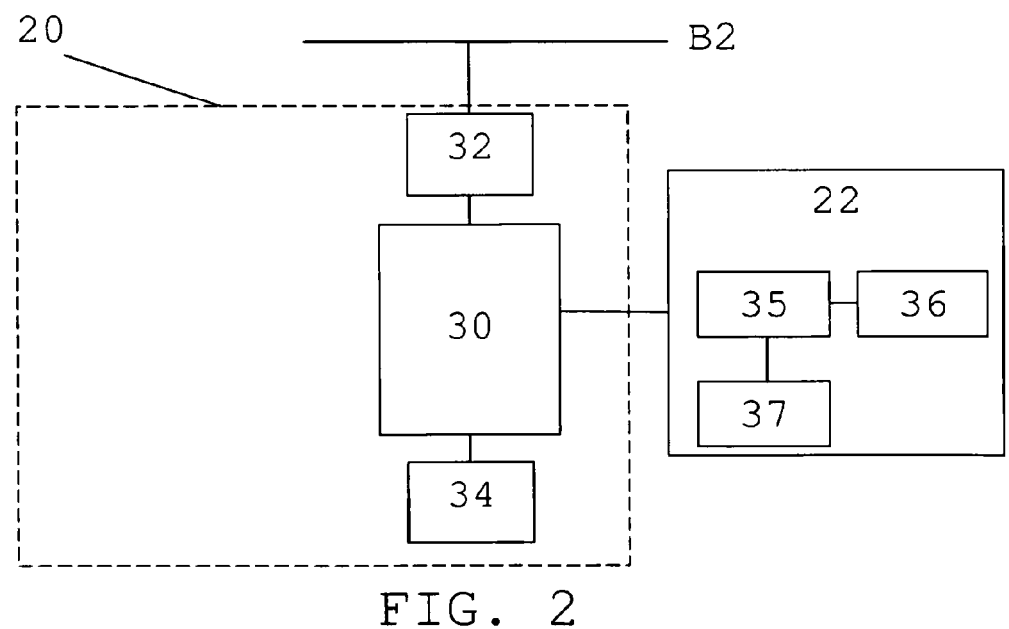
FIG. 2 shows a block schematic of a gateway for the wireless network being connected to a wireless network managing device, FIG. 3 schematically shows a superframe of the communication structure of the wireless network comprising a reporting data section and a status section, FIG. 4 schematically shows a number of nodes that are selectable in a structure of the process control system, which nodes are at least partly provided through field devices, FIG. 5 schematically shows the communication structure after having been changed by the wireless network managing device, and FIG. 6 schematically shows a number of method steps being performed by the wireless network managing device, FIG. 7 schematically shows a process control system according to a second embodiment of the invention, and FIG. 8 schematically shows a data carrier carrying program code for implementing the wireless network managing device.

FIG. 2 shows a block schematic of the gateway 20 and wireless network managing device 22. The gateway comprises a control unit 30, which is connected to a wireless interface 34, typically comprising radio circuitry and one or more antennas as well as to a communication interface 32 for communication using the second bus B2. The wireless network managing device 22 is here connected to the control unit 30. The wireless network managing device 22 here comprises a node determination element 35, a mapping table 36 and a bandwidth assigning element 37, where both the mapping table 36 and the bandwidth assigning element 37 are connected to the node determination element 35.

Figure 3:
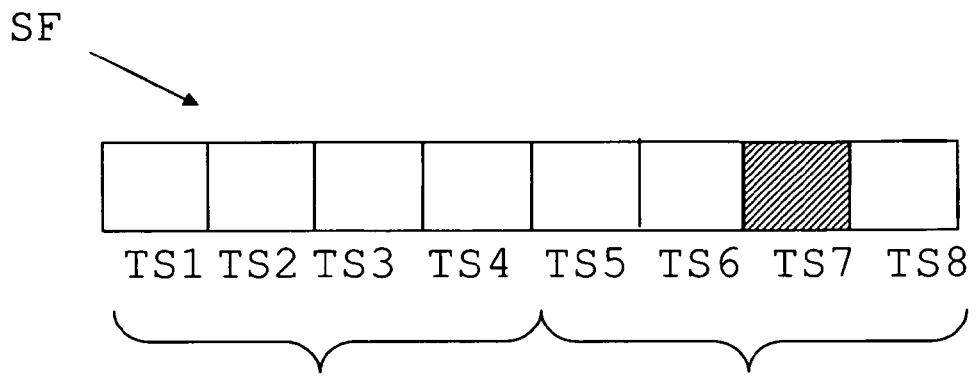

The field devices are communicating with the gateway 20 in a communication structure of the wireless network. One part of this structure is schematically shown in FIG. 3. This part of the structure is an uplink or upstream part and comprises a superframe SF, which may be made up of a number of time slots. Here a first section of the superframe comprising a first group of time slots make up a reporting data section RDS, while a second section of the super frame comprising a second group of time slots make up a status section SS. As an example the reporting data section RDS here includes four time slots TS1, TS2, TS3 and TS4, while the status section SS also comprises four time slots TS5, TS6, TS7 and TS8. In this example the time slots are furthermore of equal size and also the sections are of equal size. Here a seventh time slot TS7, which is the third time slot in the status section SS is being marked. The significance of this will be described in more detail later. The same type of superframe can also be used in a downlink or downstream part of the communication structure. This part would have corresponding sections for control data to the field devices and other data like settings and configurations. The different sections can therefore be generalized as a process control data section and an auxiliary data section, where the reporting data section is a process control data section dedicated to uplink communication and the status section is an auxiliary data section dedicated to uplink communication.

Figure 4:
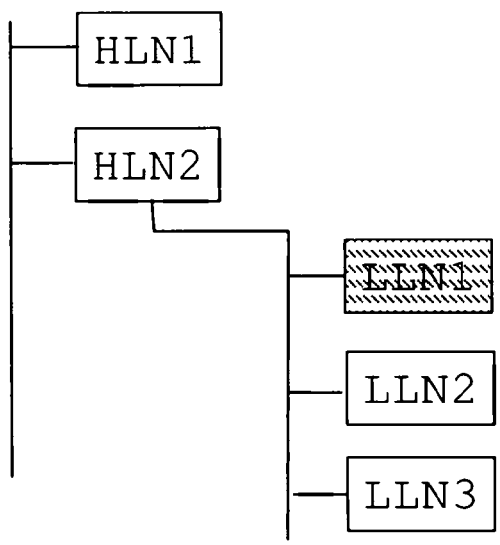

FIG. 4 shows a number of nodes in the process control system, which nodes may be presented via the operator terminals. The nodes are here provided on various hierarchical levels. There is a here first high level node HLN1 and a second high level node HLN2 on a first high hierarchical level in the structure and in a lower hierarchical level and connected to the second high level node HLN2 there is a first, second and third low level node LLN1, LLN2 and LLN3, where some of these nodes may be associated with field devices. Here the first low level node LLN1 is associated with the first field device 24, the second low level node LLN2 with the third field device 26 and the third low level node LLN3 with the third field device 28. This is just an example and other relationships may exist. However it can here be seen that the first low level node LLN1 is being marked. The significance of this will also be described in more detail later.

Figure 5:
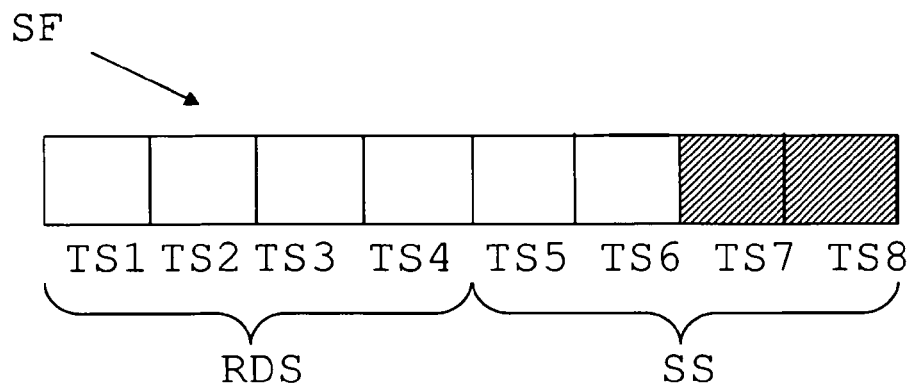

FIG. 5 shows the same type of communication structure as in FIG. 3, i.e. a superframe SF with equal sized time slots. However here the seventh and eighth timeslots TS7 and TS8 in the status section SS are being marked.

Figure 6:
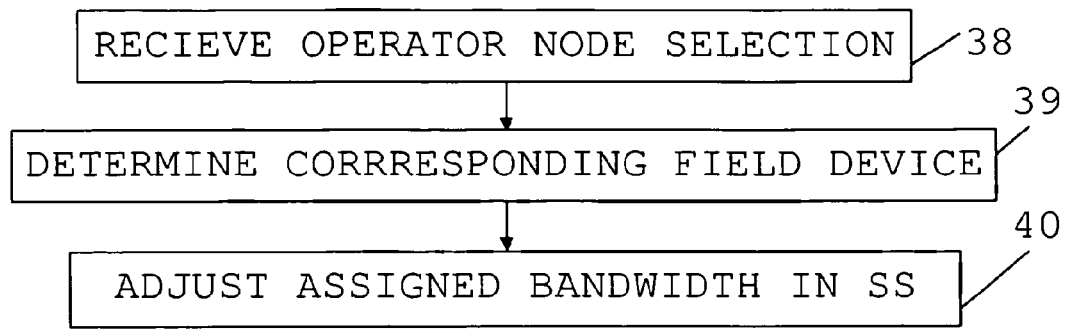

The functioning of the present invention according to a first embodiment of the invention will now be described with reference also being made to FIG. 6, which shows a flow chart of a number of method steps being performed in the wireless network managing device 22.

As mentioned earlier the field devices 24, 26 and 28 are assigned a data reporting bandwidth here in the form a reporting time slots in a reporting data section RDS as well as assigned status reporting bandwidth in the status section SS. The assignment is here made in the form of a number of time slots, here in the form of time slots of the communication structure SF.

As an example related to uplink communication, i.e. communication from the field devices to the server via the gateway, a number of field devices that report data may here be assigned one or more time slots of each superframe in order to regularly report data used for controlling the process. They may also be assigned status time slots in order to report status data, i.e. data on how they are functioning, also denoted health data. In an example related to downlink communication, i.e. communication from the server to the field devices via the gateway, field devices may be assigned time slots in the process control data section where they receive control commands and may also be assigned time slots in the auxiliary data section where they receive bulk data, for instance new configuration data.

Contemporary network managing devices are setup to adjust to dynamic behavior in the wireless network, like changing links and routes depending on the current state of the wireless network. They are therefore traditionally autonomous devices with little or no operator interaction. Information about the status of the network is the typically sent up to the server 16 on a slow interval in order to minimize power consumption. Status information may here typically comprise information about the functioning or health of the field devices. The typical response time from server to field device may be 3-7 seconds.

Having a 1 second response time from every field device is often a waste of available bandwidth and also often not feasible in large wireless sensor networks. There is, however, bandwidth that can be used to enhance the performance of the network. In Wireless HART for example only 50% of the available bandwidth is used for process data (as recommended by the standard). The other 50%, the status section SS, is used for network management and performance optimization as seen in FIGS. 3 and 5.

In this case the status time slots may be equally distributed between the field devices, which lead to them reporting status data regularly, but at times seldom, for instance every 15 minutes. The field devices may also compete for a time slot according to some contention based scheme. Both these principles may be too slow or too delayed for an operator, who may want to perform some activity in relation to a specific field device, like download some type of new software to the field device. However, before this is done the operator may be interested in obtaining more health data than is ordinarily the case or may want to provide the field device with more data, which is not so easy to do.

Furthermore, bandwidth adjustment should be made without the operator having to make settings him—or herself. The adjustment should thus be user-friendly and performed automatically without requiring that the operator has in depth knowledge of the underlying transmission schemes or technologies.

In an example given here the field devices are initially assigned bandwidth in the time slots shown in FIG. 3. As an example the first field device may more particularly be initially or as a default setting be assigned the seventh time slot, TS7, i.e. the third time slot of the status section SS for status reporting purposes, for instance for reporting health data. The field devices thus communicate with the gateway in the assigned time slots under the control of the control unit 30.

At the same time the structure of FIG. 4 may be presented on the first operator terminal 12 for an operator, who goes on and selects a node in the structure and here the first low level node LLN1, which is associated with the first field device 24. This means that in this example the functionality of the first low level node LLN1 in the process control system is provided through the first field device 24.

The operator selection in the hierarchical structure is here also sent from the operator terminal 12 to the wireless network managing device 22 and more particularly to the node determination element 35 of this device 22. The operator terminal 12 may here be configured to forward node selection data, such as the name of the selected node to the wireless network managing device 22. The node determination element 35 of the network managing device 22 therefore receives an operator node selection from the operator terminal, step 38, where the selected node in this example is the first low level node LLN1 presented in the view in FIG. 4. Thereafter the node determination element 35 consults the mapping table 36 in order to obtain data about which field device the selected node corresponds to. This table contains a mapping between system control nodes presented on the operator terminals and field devices. Based on settings in this table 36 the node determination element 35 therefore determines the field device corresponding to the selected node, step 39, which in this example is the first field device 24.

Information of the selected field device is then forwarded to the bandwidth adjusting element 37, which goes on and adjusts the assigned bandwidth in the status section SS based on the field device selection, step 40. The bandwidth adjusting element 37 thus adjusts the bandwidth assigned to the first field device 24 based on the detected selection of the field device. This change is here an increase in bandwidth and as an example the first field device is assigned the bandwidth being marked in FIG. 5. In this example the bandwidth is thus doubled so that the first field device 24 is assigned both the seventh and eighth time slots TS7 and TS8 of the super frame, i.e. the third and fourth time slots of the status section SS.

In this way it can therefore be seen that the network managing device 22 adjusts the bandwidth assigned to field devices in the status section based on operator selections at the operator terminal. In this way the operator may obtain an increase in bandwidth for a field device that is of interest to him or her without having to make such bandwidth changes him or herself. It can also be seen that the change in bandwidth is made automatically based on the operator selections. The wireless network thus dynamically reacts to the activities of the operator at the operator terminal. If the operator looks at a specific node associated with a certain field device the system may therefore automatically create a fast communication link and poll the field device for the latest status.

The invention also has a number of further advantages. It can be used with existing field devices and gateways and does not require any additional hardware. It also gives the operator an improved operation without requiring special devices. The invention also works on equipment from many different suppliers.

A change in bandwidth of one type, here an increase for a selected field device may here be combined with an opposite change of bandwidth, here a decrease for one, two, several or all other field devices in order to retain the size of the status section.

It is here furthermore possible that the bandwidth assignment in the reporting data section is not influenced by the change but only the status section.

In the example above the bandwidth adjustment was made in the status section of the part of the structure used in the uplink. As an alternative it is possible that the same type of bandwidth adjustment is made in the auxiliary data section of the downlink part of the structure. As yet another alternative it is possible that the adjustment is made for both uplink and downlink communication, i.e. in both the uplink and downlink parts of the structure. All variations described above in relation to the uplink communication can here of course also be made for the downlink.

It is here possible that a number of variations are made in the selection. The described bandwidth change is merely exemplifying. It is for instance possible with more or less than a doubling of the bandwidth in the case of an increase. It is also possible that the change in bandwidth is not limited to time slots, but that any type of bandwidth change is possible.

The operator may as another alternative select one section in the process control system, for instance through selecting the second high level node HLN2, and this may change the bandwidth of all the low level nodes associated with or linked to this high level node in the structure. In the example of FIG. 4 a selection of the second high level node HLN2 would lead to a selection of all field devices of this section and also a change, for instance an increase, in bandwidth for the field devices associated with all these linked low level nodes LLN1, LLN2 and LLN3. Other field devices that are not associated with the same section would then not receive the same type of bandwidth change. They may for instance be unaffected or perhaps receive an opposite change in bandwidth, for instance a decrease.

It is also possible that the bandwidth of field devices is changed based on the order in which they appear in a control structure, i.e. in the order that they are used in the control of the process. If for instance a field device associated with a valve upstream in the control of a process is selected, then the next field device downstream of the selected field device may also be automatically selected perhaps together with a previous field device upstream from the selected field device. It is also possible that only the previous and selected field devices get their bandwidths changed. It is here also possible that the field devices receive a gradual increase and/or decrease in bandwidth. The selected field device may for instance have a higher bandwidth than the previous and next field device and if the next field device is thereafter selected, it will receive a high bandwidth while the previously selected field device gets its bandwidth lowered. It is also possible that the selection of a field device of one type increases the bandwidth of all field devices of the same type in the wireless network.

Figure 7:
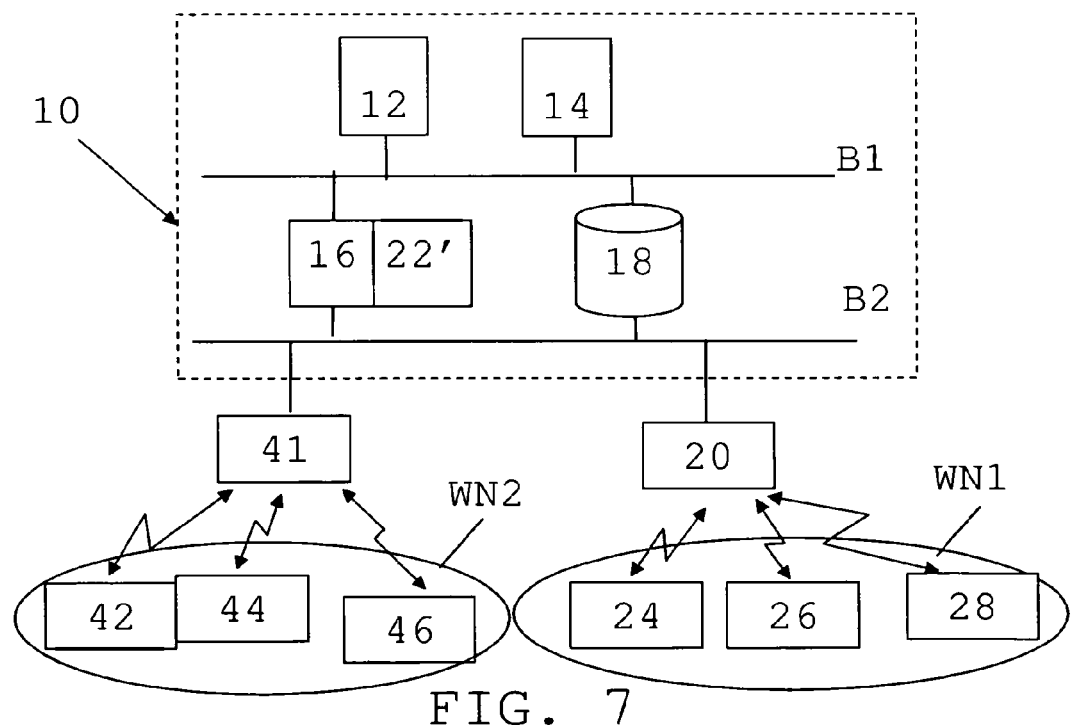

The invention can be varied in more ways. It is for instance possible that the process control system comprises more wireless sensor networks. This type of situation is schematically shown in FIG. 7, which shows the process control system 10 with the first wireless network WN1 but also with a second wireless network WN2 comprising a fourth, fifth and sixth wireless field device 42, 44 and 46. These further field devices of the second wireless network WN2 are connected to the process control system via a second gateway 41. In this case the network managing device 22 can manage both wireless networks. In order to do this it is in this variation of the invention provided at another location in the process control system. In this variation the network managing device 22' is therefore connected to the server 16.

The operator terminal 12 may include a user input unit, a display unit, a display control unit and an interface for communicating with the other parts of the process control system 10 via the first bus B1. An operator terminal provides a graphical user interface for an operator of the system.

Figure 8:
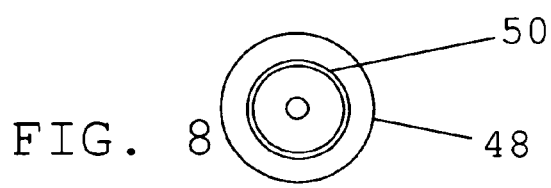

The network managing device may be realized in the form of a discrete component, such as an Application Specific Integrated Circuit (ASIC). However, the node determination element and bandwidth assigning element of the wireless network managing device may also be realized through a processor with an associated program memory including computer program code for performing the functionality of these elements when being run on the processor. The mapping table may in turn be provided in the form of a memory. This computer program product can be provided as a data carrier such as one or more CD ROM discs or one or more memory sticks carrying computer program code, which provides the above-described wireless network managing device when being run by said processor. One such data carrier 48 in the form of a CD ROM disk with a computer program 50 carrying such computer program code is schematically shown in FIG. 8.

From the foregoing discussion it is evident that the present invention can be varied in a multitude of ways. It shall consequently be realized that the present invention is only to be limited by the following claims.

What is claimed is:

1. A method for assigning bandwidth to wireless field devices in an auxiliary data section of a superframe used by a wireless network, where the field devices are assigned a process control bandwidth in a process control data section of the superframe, said wireless network being provided in a process control system, the method comprising the steps of:
   receiving an operator selection of at least one node in the process control system via an operator terminal, the at least one node being at least one of a plurality of nodes presented to an operator via the operator terminal,
   determining, via a node determination element of a networking managing device, at least one field device implementing the functionality of the node selected by the operator,
   adjusting the bandwidth assigned to said at least one field device in the auxiliary data section of the superframe based on the received operator selection by reassigning one or more existing time slots in the auxillary data section of the superframe to said at least one field device, where said process control bandwidth is unaffected by the operator selection; and
   adjusting the bandwidth of one or more field device upstream or downstream of the selected field device according to the order in which the field devices are used in process control.

2. The method according to claim 1, wherein the bandwidth is increased for the selected field device.

3. The method according to claim 1, wherein the operator selection is the selection of all field devices in a section of the process control system.

4. The method according to claim 1, wherein the selected field device is of a first type and the bandwidth of other field devices of the same type is also adjusted.

5. The method according to claim 1, wherein said adjustment is made in an uplink part of the superframe.

6. The method according to claim 1, wherein said adjustment is made in a downlink part of the superframe.

7. The method according to claim 1, wherein each of the wireless field devices is initially assigned an equal number of time slots in the auxiliary data section of the superframe, and wherein the step of adjusting the bandwidth assigned to said at least one field device in the auxiliary data section includes increasing a number of time slots assigned to said at least one field device in the auxiliary data section and decreasing a corresponding number of time slots assigned to at least one other one of the wireless field devices in the auxiliary data section in order to retain the size of the auxiliary data section.

8. A wireless network managing device for a wireless network that is part of a process control system, the wireless network managing device comprising:
   a node determination element configured to receive an operator selection of at least one node in the process control system via an operator terminal, the at least one node being at least one of a plurality of nodes presented to an operator via the operator terminal, and determine at least one field device implementing the functionality of the node selected by the operator, and
   a bandwidth control element configured to adjust a bandwidth assigned to said at least one field device in an auxiliary data section of a superframe used by said communication network based on the received operator selection by reassigning one or more existing time slots in the auxillary data section of the superframe to said at least one field device, wherein the bandwidth control element is further configured to adjust the bandwidth of one or more field devices upstream or downstream of the selected field device according to the order in which the field devices are used in process control, and assign a process control bandwidth in a process control data section of the superframe to the field devices, said process control bandwidth being unaffected by the operator selection.

9. The wireless network managing device according to claim 8, wherein the bandwidth control element is configured to increase the bandwidth for the selected field devices.

10. The wireless network managing device according to claim 8, wherein the operator selection is the selection of all field devices in a section of the process control system.

11. The wireless network managing device according to claim 8, wherein the selected field device is of a first type and the bandwidth control element is further configured to adjust the bandwidth of other field devices of the same type.

12. The wireless network managing device according to claim 8, wherein the bandwidth control element is configured to adjust the bandwidth in an uplink part of the superfame.

13. The wireless network managing device according to claim 8, wherein the bandwidth control element is configured to adjust the bandwidth in a downlink part of the superframe.

14. The wireless network managing device according to claim 8, wherein each of a plurality of field devices is initially assigned an equal number of time slots in the auxiliary data section of the superframe, and wherein upon on receipt of the operator selection said bandwidth control element increases a number of time slots assigned to said at least one field device in the auxiliary data section and decreases a corresponding number of time slots assigned to at least one other one of the plurality of field devices in the auxiliary data section in order to retain the size of the auxiliary data section.

15. A computer program product for a wireless network managing device for a wireless network that is part of a process control system, the computer program product comprising a non-transitory data carrier with computer program code which when run on a processor forming the wireless network managing device, causes the wireless network managing device to:

receive an operator selection of at least one node in the process control system via an operator terminal, the at least one node being at least one of a plurality of nodes presented to an operator terminal, determine, via a node determination element of a networking managing device, at least one field device implementing the functionality of the node selected by the operator, and adjust a bandwidth assigned to said at least one field device in an auxiliary data section of a superframe used by said wireless network based on the received operator selection by reassigning one or more time slots in the auxillary data section of the superframe to said at least one field device, where the field devices are assigned a process control bandwidth in a process control data section of the superframe, said process control bandwidth being unaffected by the operator selection, and adjusting the bandwidth of one or more field devices upstream or downstream of the selected field device according to the order in which the field devices are used in process control.

16. The computer program product according to claim 15, wherein each of a plurality of field devices is initially assigned an equal number of time slots in the auxiliary data section of the superframe, and wherein upon on receipt of the operator selection a number of time slots assigned to said at least one field device in the auxiliary data section is increased and a corresponding number of time slots assigned to at least one other one of the plurality of field devices in the auxiliary data section is decreased in order to retain the size of the auxiliary data section.

* * * * *